US012671303B2

(12) United States Patent
Chen et al.

(10) Patent No.: US 12,671,303 B2
(45) Date of Patent: Jun. 30, 2026

(54) VIBRATION MOTOR

(71) Applicant: AAC Microtech (Changzhou) Co., Ltd., Changzhou (CN)

(72) Inventors: Weibo Chen, Changzhou (CN); Xiaorong Zhou, Changzhou (CN); Ziyang Zhang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 228 days.

(21) Appl. No.: 18/539,281

(22) Filed: Dec. 14, 2023

(65) Prior Publication Data

US 2024/0339907 A1     Oct. 10, 2024

Related U.S. Application Data

(63) Continuation of application No. PCT/CN2023/087197, filed on Apr. 10, 2023.

(51) Int. Cl.
H02K 33/18 (2006.01)
H02K 3/50 (2006.01)

(52) U.S. Cl.
CPC .............. H02K 33/18 (2013.01); H02K 3/50 (2013.01); *H02K 2203/03* (2013.01); *H02K 2203/06* (2013.01)

(58) Field of Classification Search
CPC ...... H02K 33/18; H02K 3/50; H02K 2203/03; H02K 2203/06; H02K 2211/03; H02K 5/22; H02K 5/225
See application file for complete search history.

(56) References Cited

U.S. PATENT DOCUMENTS

2008/0144290 A1*   6/2008   Brandt ................. H05K 5/0052
                                                         361/720

FOREIGN PATENT DOCUMENTS

KR           101321009 B1 * 10/2013   ............... H02K 5/22

OTHER PUBLICATIONS

English translation of KR-101321009-B1 (Year: 2013).*

* cited by examiner

*Primary Examiner* — Tulsidas C Patel
*Assistant Examiner* — Joshua Kiel M Rodriguez
(74) *Attorney, Agent, or Firm* — Wiersch Law Group

(57)            ABSTRACT

The vibration motor includes a casing, a stator, a vibrator, and an elastic connector suspended inside the casing. The stator includes a circuit board fixed to the casing and a coil fixedly connected to the circuit board. The circuit board includes a bonding pad, and the coil includes a coil body and a lead wire. The circuit board is provided with an avoiding portion that avoids a junction between the lead wire and the coil body, and the avoiding portion is provided with back glue that isolates the lead wire from the casing. The vibration motor of the present application isolates the lead wire of the coil and the casing by adding back glue at the avoiding portion, which prevents the lead wire of the coil from being in electrical contact with the casing caused by the coil being damaged under pressure or impact, thereby preventing adverse effects.

7 Claims, 3 Drawing Sheets

VIBRATION MOTOR

CROSS REFERENCE TO RELATED APPLICATIONS

The present disclosure is a continuation of PCT Patent Application No. PCT/CN2023/087197, entitled "VIBRATION MOTOR," filed Apr. 10, 2023, which is incorporated by reference herein in its entirety.

TECHNICAL FIELD

The embodiments of the present application relate to the technical field of vibration motors, in particular to a vibration motor including a coil as stator.

BACKGROUND

A vibration motor is a transmission device that directly converts electrical energy into linear motion mechanical energy without the need for any intermediate conversion mechanism.

The vibration motor in the related technologies includes a casing, a vibrator, and a stator. The stator includes a coil. The vibrator is supported inside the casing by a spring bracket, and the coil is welded and fixed to a circuit board. The circuit board generally has a notch and a through slot to keep away from a coil lead. However, it is difficult to ensure that the coil lead is tightly attached to the coil, and there is a certain probability that the coil lead will contact the cover plate of the casing. Under pressure or impact force, the coil will be damaged, which causes the coil lead to be in electrical contact with the cover plate, thereby causing adverse effects.

Therefore, it is necessary to provide a new vibration motor to solve the above technical problems.

SUMMARY

The objective of the present application is to provide a vibration motor that has a stable structure.

In order to achieve the above objective, the technical solutions of the present application are as follows. A vibration motor includes a casing, a stator installed inside the casing, a vibrator, and an elastic connector suspended inside the casing. The stator includes a circuit board fixed to the casing and a coil fixedly connected to the circuit board. The circuit board includes a bonding pad, and the coil includes a coil body and a lead wire extending from the coil body and welded to the bonding pad. The circuit board is provided with an avoiding portion that avoids a junction between the lead wire and the coil body, and the avoiding portion is provided with back glue that isolates the lead wire from the casing.

As an improvement, the back glue is arranged between the circuit board and the casing.

As an improvement, the avoiding portion is filled with the back glue.

As an improvement, the lead wire includes an inlet lead wire and an outlet lead wire arranged on a same side of the coil.

As an improvement, the back glue is configured to cover a projection of the circuit board on the casing.

As an improvement, the casing is made of metal material.

As an improvement, the casing includes a casing and a cover plate arranged on the casing, and the stator is fixed to the cover plate.

Compared with related technologies, a vibration motor is provided according to the present application, and the vibration motor includes a casing, a stator installed inside the casing, a vibrator, and an elastic connector that suspends the vibrator inside the casing. The stator includes a circuit board fixed to the casing and a coil fixedly connected to the circuit board, the circuit board includes a bonding pad, and the coil includes a coil body and a lead wire extending from the coil body and is welded and fixed to the bonding pad. The circuit board is provided with an avoiding portion that avoids a junction between the lead wire and the coil body, and the avoiding portion is provided with back glue that isolates the lead wire from the casing. The vibration motor provided according to the present application isolates the lead wire of the coil and the casing by adding a back glue at the avoiding portion, which prevents the lead wire of the coil from being in electrical contact with the casing caused by the coil being damaged under pressure or impact, thereby preventing adverse effects.

BRIEF DESCRIPTION OF THE DRAWINGS

FIG. 1 is a schematic three-dimensional structural view of a vibration motor provided according to the present application;

FIG. 2 is a partial explosive view of the vibration motor shown in FIG. 1;

DETAILED DESCRIPTION

The technical solutions according to the embodiments of the present application will be described clearly and completely as follows in conjunction with the drawings in the embodiments of the present application. It is apparent that the described embodiments are only a part of the embodiments according to the present application, rather than all of the embodiments. Based on the embodiments of the present application, all other embodiments obtained without creative efforts by those of ordinary skill in the art shall fall within the protection scope of the present application.

Figures 1, 2:
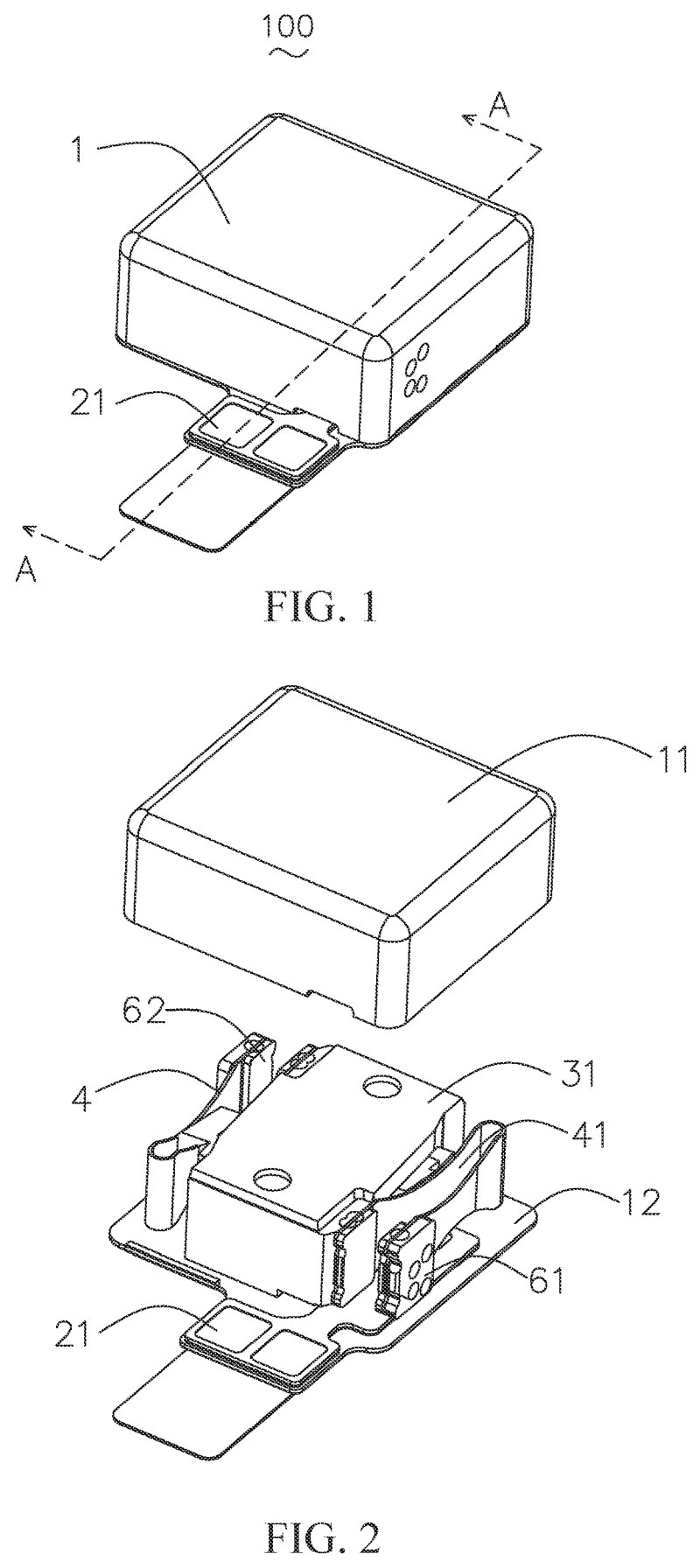
Figure 3:
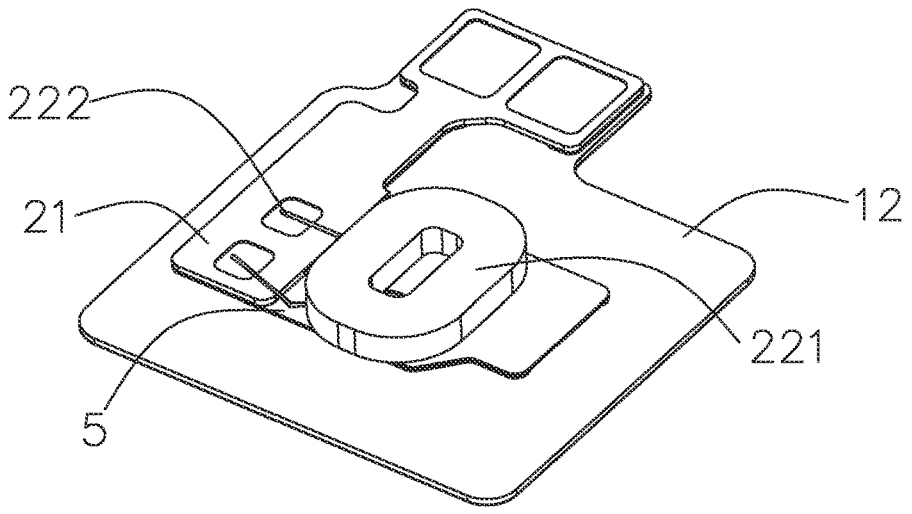
FIG. 3 is a schematic three-dimensional structural view of a cover plate and a stator in the vibration motor as shown in FIG. 1.
Figure 4:
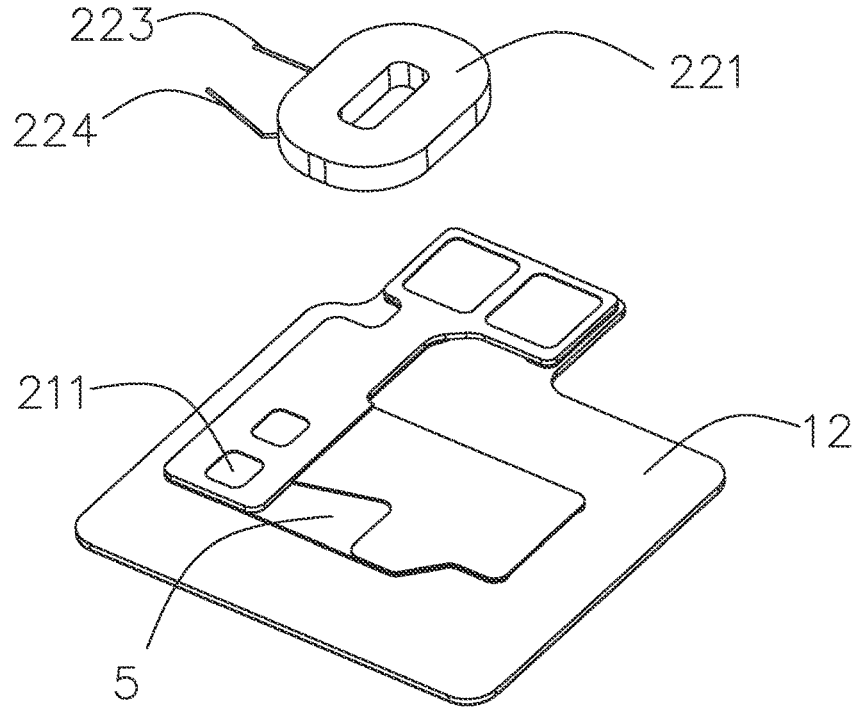
FIG. 4 is a partial explosive view of the cover plate and the stator in the vibration motor as shown in FIG. 3.
Figure 5:
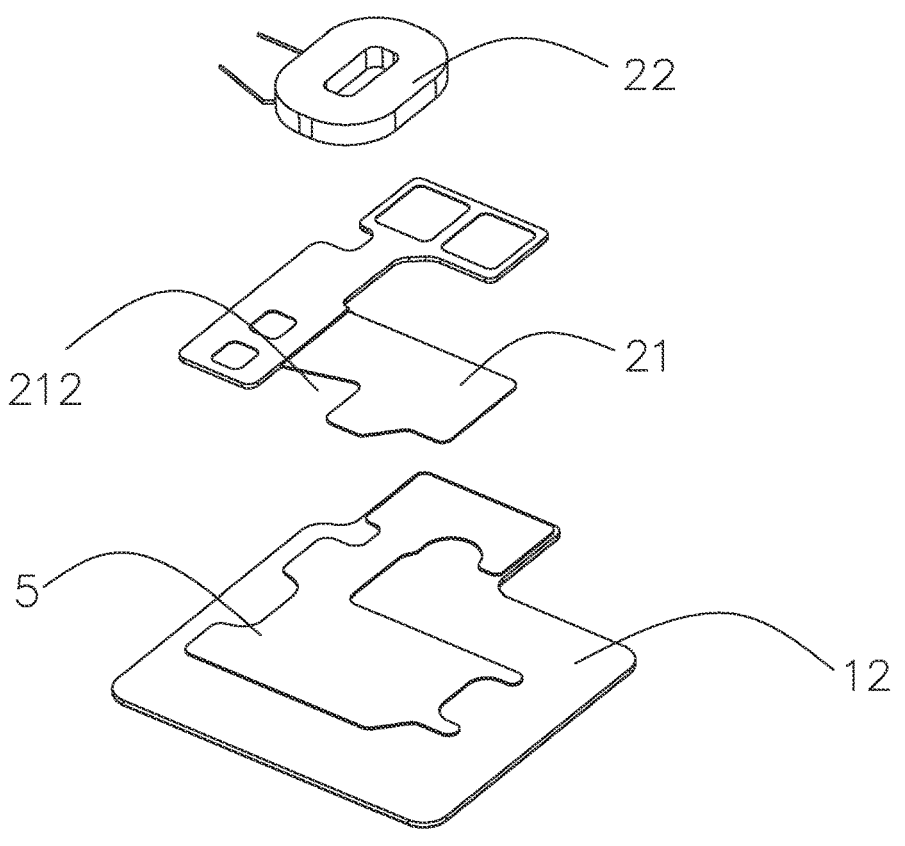
FIG. 5 is an explosive view of the cover plate and the stator in the vibration motor shown in FIG. 3.
Figure 6:
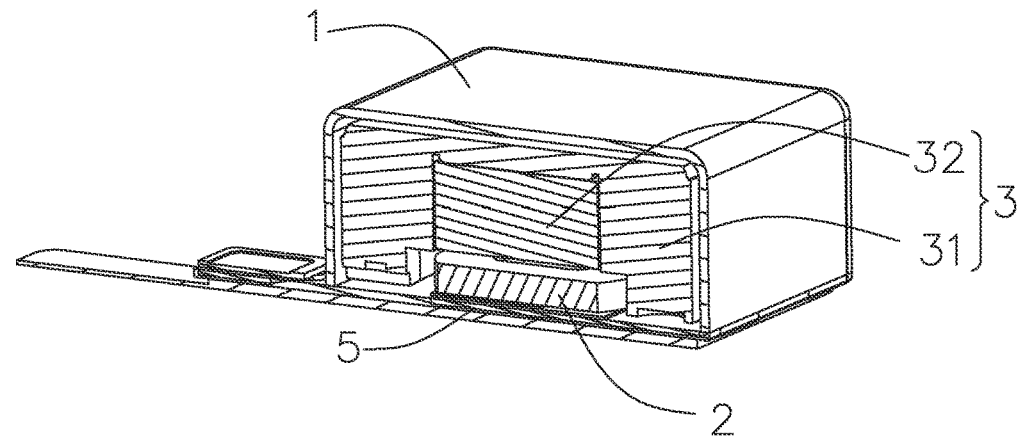
FIG. 6 is a cross-sectional view of the vibration motor shown FIG. 1 along A-A.

Referring to FIG. 1 to FIG. 6, a vibration motor 100 is provided according to the present application, and the vibration motor 100 includes a casing 1, a stator 2 installed inside the casing 1, a vibrator 3 configured to provide vibration, an elastic connector 4 configured to suspend the vibrator 3 inside the casing 1, and a back glue 5 arranged between the casing 1 and the stator 2.

The casing 1 is made of metal material, which includes an outer casing 11 and a cover plate 12 configured to cover the outer casing 11, and the stator 2 is fixed to the cover plate 12. The outer casing 11 and the cover plate 12 are fixedly to form a space to accommodate the stator 2 and the vibrator 3.

The stator 2 includes a circuit board 21 fixed to the cover plate 12, and a coil 22 fixedly connected to the circuit board 21. The circuit board includes a bonding pad 211. A part of the circuit board 21 extends out of the casing 1. The coil 22 is fixed on the circuit board 21 and electrically connected to the circuit board 21, to provide alternating current to the coil 22.

The coil 22 includes a coil body 221 and a lead wire 222 extending from the coil body 221 and is welded and fixed to the bonding pad 211. The circuit board 21 is provided with an avoiding portion 212 that avoids a junction between the lead wire 222 and the coil body 221. The avoiding portion 212 penetrates through the circuit board 21, and the avoiding portion is provided with back glue 5 that isolates the lead wire 222 from the cover plate 12. Specifically, the back glue 5 is arranged between the cover plate 12 and the circuit board 21, and the back glue 5 is configured to cover the entire projection of the circuit board 21 on the cover plate 12, that is, the area of the back glue 5 is greater than the area of the circuit board 21. Of course, the back glue 5 between the cover plate 12 and the circuit board 21 may also further extend into the avoiding portion 212. In other embodiments, the back glue 5 may also be arranged only in the avoiding portion 212. The lead wire 222 includes an inlet lead wire 223 and an outlet lead wire 224. Preferably, the inlet lead wire 223 and the outlet lead wire 224 are arranged on the same side of the coil 22 and are arranged on a side of the coil 22 close to the bonding pad 211 of the circuit board 21. Therefore, a distance between the inlet lead wire 223 and the outlet lead wire 224 is relatively close, which can limit the size and quantity of the avoiding portion 212. Preferably, only one smaller avoiding portion 212 is provided, which facilitates production.

Due to the difficulty in ensuring a close contact between the lead wire 222 and the coil body 221 of coil 22, there is a certain probability that the lead wire 222 of the coil 22 comes into contact with the cover plate 12. In addition, under pressure or impact, the lead wire 222 of the coil 22 is easily damaged, which makes it more likely to cause the lead wire 222 of the coil 22 to be in electrical contact with the cover plate 12, thereby causing adverse effects. It is precisely due to the presence of the back glue 5 that the metal cover plate 12 can be completely isolated from the lead wire 222 of the coil 22, thus eliminating this hidden danger.

The vibrator 3 is suspended inside the casing 1 by the elastic connector 4, and the vibrator 3 vibrates horizontally to the left and right, to cause the vibration motor 100 to provide vibration. The vibrator 3 includes a mass block 31 and a magnetic steel component 32 fixed within the mass block 31. The magnetic steel component 32 is arranged corresponding to the coil 22.

The coil 22 is fed with alternating current, which cuts the magnetic induction line of the magnetic steel component 32 to generate induced electromotive force, which causes the magnetic steel component 32 and the fixed mass block 31 to vibrate back and forth, to provide vibration.

The elastic connector 4 elastically supports the vibrator 3. An end of the elastic connector 4 is connected to the mass block 31 and the other end of the elastic connector 4 is connected to the casing 11 by a bonding pad 61, to provide an elastic recovery force to the vibrator 3. The elastic connector 4 is a V-shaped elastic piece, which includes at least two opposite plate shaped elastic pieces 41, and there is a stopper 62 between ends of two opposite surfaces of the two elastic pieces 41. In this embodiment, the number of the elastic connectors 4 is two.

Compared with related technologies, a vibration motor is provided according to the present application, and the vibration motor includes a casing, a stator installed inside the casing, a vibrator, and an elastic connector that suspends the vibrator inside the casing. The stator includes a circuit board fixed to the casing and a coil fixedly connected to the circuit board, the circuit board includes a bonding pad, and the coil includes a coil body and a lead wire extending from the coil body and is welded and fixed to the bonding pad. The circuit board is provided with an avoiding portion that avoids a junction between the lead wire and the coil body, and the avoiding portion is provided with back glue that isolates the lead wire from the casing. The vibration motor provided according to the present application isolates the lead wire of the coil and the casing by adding a back glue in at the avoiding portion, which prevents the lead wire of the coil from being in electrical contact with the casing caused by the coil being damaged under pressure or impact, thereby preventing adverse effects.

The above are only the embodiments of the present application. It should be pointed out that for those of ordinary skill in the art, improvements may be made without departing from the inventive concept of the present application, and the improvements shall fall with the scope of protection of the present application.

What is claimed is:

1. A vibration motor comprising a casing, a stator installed inside the casing, a vibrator, and an elastic connector suspended inside the casing, wherein the stator comprises a circuit board fixed to the casing and a coil fixedly connected to the circuit board, the circuit board comprises a bonding pad, the coil comprises a coil body and a lead wire extending from the coil body and welded to the bonding pad, characterized in that, a back glue for bonding the circuit board and the casing is provided between the lower surface of circuit board and the corresponding surface of the casing, the circuit board is provided with an avoiding portion that avoids a junction between the lead wire and the coil body, and the avoiding portion is provided with the back glue that isolates the lead wire from the casing, the avoiding portion is an avoidance notch that exposes a part of the back glue and the lead wire is positioned directly above the exposed part of the back glue.

2. The vibration motor according to claim 1, wherein the avoiding portion is filled with the back glue.

3. The vibration motor according to claim 2, wherein the casing comprises an outer casing and a cover plate arranged on the outer casing, and the stator is fixed to the cover plate.

4. The vibration motor according to claim 1, wherein the lead wire comprises an inlet lead wire and an outlet lead wire arranged on a same side of the coil.

5. The vibration motor according to claim 1, wherein the back glue is configured to cover a projection of the circuit board on the casing.

6. The vibration motor according to claim 1, wherein the casing is made of metal material.

7. The vibration motor according to claim 1, wherein the casing comprises an outer casing and a cover plate arranged on the outer casing, and the stator is fixed to the cover plate.

* * * * *